June 7, 1966

W. N. FRANDSEN 3,255,159

DIRT TRAP FOR DOWNFLOW REACTORS

Filed Sept. 22, 1964

INVENTOR:
Walter N. Frandsen

BY: *James R. Hoatson Jr.*
*William H. Page II*
ATTORNEYS

United States Patent Office 3,255,159
Patented June 7, 1966

3,255,159
DIRT TRAP FOR DOWNFLOW REACTORS
Walter N. Frandsen, Des Plaines, Ill., assignor to Universal Oil Products Company, Des Plaines, Ill., a corporation of Delaware
Filed Sept. 22, 1964, Ser. No. 398,217
11 Claims. (Cl. 23—288)

This invention relates to the art of fluid-solid contacting apparatus and more particularly to a particle separator for use in downflow contactors and reactors utilizing a fixed bed of solid contact material. This application is a continuation-in-part of application Serial No. 200,869, filed June 7, 1962 and now abandoned.

Fixed bed contactors are widely employed in the petroleum refining and chemical process industries. Exemplary applications include the contacting of gaseous, vapor or mixed phase reactants with a solid particle-form catalyst in such processes as naphtha reforming, hydrodesulfurization of naphthas and middle distillates, hydrogenation and hydrodealkylation of aromatic stocks, isomerization of normal paraffins, polymerization of olefins, fixed bed hydrocracking of heavy oils, etc.; other uses include the desiccant drying of wet gaseous streams and the separation of mixtures of compounds by selective sorption with molecular sieves.

Of the three basic designs of fixed bed contactors—upflow, radial flow, and downflow—the latter perhaps enjoys the most widespread commercial usage for several reasons including simplicity of design, uniform space velocity and minimum loss of the contact material through attrition. In the upflow apparatus the catalyst bed or portions thereof is subject to lifting or upheaving whenever the bottom becomes plugged or partially plugged with fines, causing attrition and abrasion of the catalyst particles; in the radial flow apparatus, the vessel internals are necessarily more elaborate and a non-linear space velocity with respect to bed radius inherently obtains. Whereas the downflow apparatus avoids these complications, it nevertheless suffers one substantial operational drawback which is that its catalyst bed, particularly the upper portion thereof near the vessel inlet, is especially susceptible to plugging by rust, dust and other finely divided solid or semi-solid foreign material entrained in the contactor feed stream. Such foreign matter is introduced from one or more various sources and may comprise, for example, mill scale torn loose from plant equipment carrying the feed stream, metallic scale or dust formed as corrosion products, material pumped in with the feed from storage tanks or other feed sources, or coke which may have been formed in the equipment, such as a heater through which the contactor feed is charged. The plugging of the catalyst bed, which occurs primarily at the top surface thereof, develops excessive pressure drop through the bed, promotes channeling therethrough, and develops dead zones within the contact mass, resulting in over-reaction of some portions of the reactants and under-reaction of others, as well as a generally haphazard deactivation of various regions of the catalyst bed.

Numerous schemes have been advanced for alleviating the problem of plugging. One design, exemplified by U.S. Patent 3,006,740, provides a plurality of screen baskets extending down into the bed to increase the surface area. Although this has helped, it has not been an entirely satisfactory solution, since it does not attempt to remove and isolate the foreign material from the catalyst bed but merely decreases its surface concentration by spreading the clogging over a larger part of the bed. There have been various other suggestions made for increasing further the surface area of the bed but the deficiencies in all of these is that the catalyst bed itself is used to filter out the solids from the incoming feed vapors. Another quite common design provides a flat plate or impingement baffle spaced directly below the feed inlet upon which the inlet vapors are impinged and then caused to undergo a series of directional changes in flow before entering the catalyst bed; this technique has proven undesirable in practice since the impact forces inhering in the impingement break up at least some of the entrained foreign particles into smaller ones which in turn flow into the first few inches of the catalyst bed and comprise the major cause of the plugging.

The particle separator or dirt trap of the present invention affords a different approach to the problem of plugging in that it provides a means for immediately separating the subdivided foreign material from the feed stream before the latter is introduced into the contact mass, while avoiding the use of an impingement baffle. The resulting disengaged fines are then collected in a solids accumulation zone isolated from the contact mass.

In one embodiment, this invention relates to a dirt trap for a contacting chamber having a fluid inlet in the top thereof, which dirt trap comprises a vertical, preferably vertically elongated, imperforate-walled casing having an open upper end spaced below and axially aligned with said fluid inlet, an imperforate closure member across the lower portion or lower end of said casing, and a grating means extending across the upper portion of the casing below said upper end.

Another embodiment of this invention provides a dirt trap for a contacting chamber having a fluid inlet in the top thereof, which dirt trap comprises an axial cylindrical downcomer depending from said inlet and being of greater diameter than the inlet, a vertically elongated cylindrical casing having an open upper end spaced below and axially aligned with said downcomer, said casing being of greater diameter than the downcomer, an imperforate bottom closure member across the lower end of said casing, a circular grating extending horizontally across the upper interior portion of the casing, and a peripheral relief vent means comprising a plurality of peripherally spaced perforations in said casing arranged in a narrow band immediately below said grating, the remaining lower portion of said casing being imperforate and fluid tight.

The principle of operation of the present dirt trap essentially involves the passage of the downflowing inlet vapor jet through a grating member and thence into an enclosed vapor pocket with a sudden full reversal of flow direction. The inlet jet is broken up into a plurality of smaller jets by the grating which is in essence a rugged screen member having openings therein which are large enough so that they will not be plugged with the largest particles in the inlet stream. By changing the inlet jet, which enters the contacting chamber at essentially inlet line diameter, to multiple small jets the vapor velocity is reduced and the pressure inside of the enclosed vapor pocket below the grating is increased slightly above the pressure in the remainder of the contacting chamber. The vapor, however, must leave the trap, the lower portion of which is fluid-tight, therefore it undergoes sudden and complete reversal of flow direction. The solid foreign particles, which are unaffected by pressure and which have a much higher unit density than the vapor phase, will, by their own inertia, flow into the region of lower gas velocity below the grating and be directed to the bottom of the trap. Since the solid material entrained in the feed stream may range in size from microscopic up to perhaps 1 inch in diameter, there exists a lower limit in particle size which can be retained by the trap. This lower limit is determined by the inlet jet velocity, the residual velocity below the grating, and the terminal or free-falling velocity of the particle of this minimal diameter in the particular vapor. However, the larger particles in the bottom of the trap help to retain the smaller particles in the interstices between the larger ones.

The structure, arrangement and advantages of the present invention may be more clearly understood upon reference to the accompanying drawings, which are presented as illustrative of the preferred construction but are not intended to be limiting in any way upon the broad scope of the invention.

FIGURE 1 of the drawing is a sectional elevation view of a typical downflow reactor containing one embodiment of the dirt trap which utilizes a vented casing.

Figure 1:
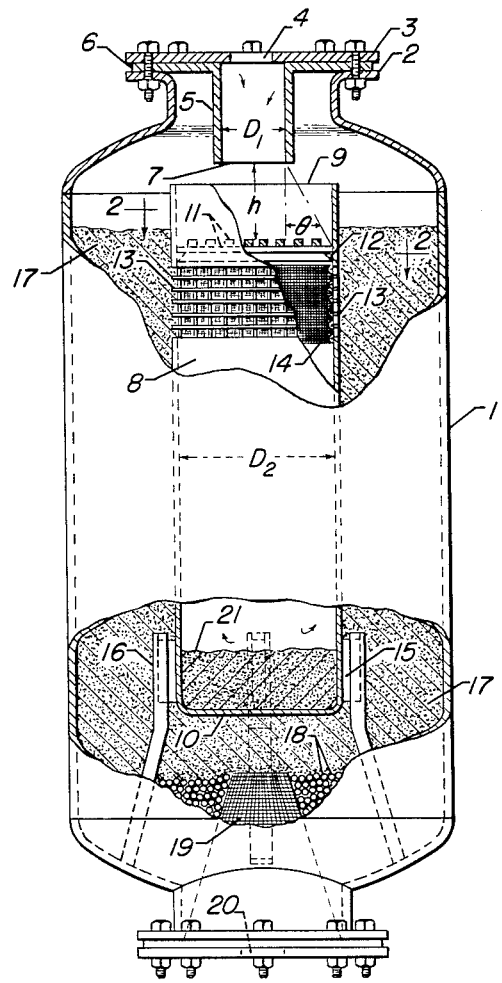

With reference first to FIGURE 1, there is shown a vertical pressure vessel 1 having an upper centrally positioned flanged nozzle or manway 2 which furnishes access to the vessel interior for purposes of catalyst loading and installing and removing the vessel internals. Manway 2 is normally closed by means of a suitable closure member, such as flange 3 bolted thereto. Opening 4 in flange 3 serves as the upper fluid inlet to the vessel. A similar opening 20 at the bottom of the vessel serves as the fluid outlet. During operation openings 4 and 20 are suitably connected to the usual process piping not here illustrated.

Depending from inlet 4 is an axially positioned nozzle member or downcomer 5 which extends a short distance into the upper portion of vessel 1 and terminates in a lower open end 7. Downcomer 5 is flared to provide an upper annular lip 6 which is compressed between manway 2 and flange 3 thereby furnishing a gasketing and sealing means for the inlet as well as the means of support for the downcomer; alternatively, downcomer 5 may be butt-welded directly to the undersurface of flange 3. Downcomer 5 is preferably cylindrical, as illustrated, with an inside diameter $D_1$ slightly greater than the diameter of opening 4. However, the downcomer may have a square section, or pentagonal, hexagonal or other polygonal cross-section roughly approximating the circular and may further be tapered longitudinally to provide a convergent or divergent nozzle.

Figure 2:
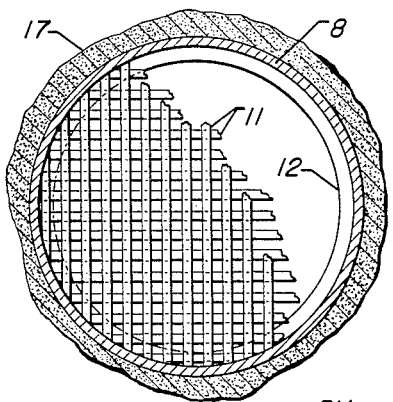
FIGURE 2 is a sectional plan view of the grating member of the trap taken along line 2—2 of FIGURE 1.

A vertically elongated cylindrical casing 8 is axially aligned with and spaced below downcomer 5. The inside diameter $D_2$ of the casing is greater than the inside diameter $D_1$ of the downcomer. The upper end 9 of casing 8 is open while the lower end thereof is sealed by means of an imperforate bottom closure member. A circular grating member 11, a plan view of which is shown in FIGURE 2, extends horizontally across the upper interior portion of casing 8 and is positioned a short distance below its upper end 9. The grating member 11 is removably inserted therein and rests upon a supporting ring 12 welded to the interior surface of casing 8. The grating may be constructed by casting or by welding together opposing rows of metal rods or bars, or it may simply be a section of heavy screening. The openings therein may be square, round, oval or slotted and preferably have a minimum inside dimension of from about ½ inch to about 2 inches. The free area of the grating may range from about 15% to about 85%, with such values in the higher range being preferred as considerations of adequate structural strength may permit.

A relatively narrow section of the longitudinal wall of casing 8 immediately below grating 11 comprises a cylindrical grating or grillwork 13, which acts as a peripheral relief vent for the vapors trapped within casing 8. A fine mesh screen lining 14 overlies the grating on the inside of casing 8. More generally, in lieu of a grating, the relief vent may comprise a narrow band of vertically and circumferentially spaced holes or slots. The vertical width of grating 13 may range from about 5% to about 25% of the length of casing 8, and the aggregate perforated area of grating 13 may vary from 15% to 85% of its total cylindrical area. The remaining upper and lower end sections of the longitudinal wall of casing 8 are imperforate and fluid-tight. The purpose of this peripheral relief vent is to enable a portion of the vapors within casing 8 to escape by radial flow into the surrounding catalyst bed, thereby reducing the backflow of vapor through the periphery of horizontal grating 11, lessening the degree of fines entrainment, and resulting in a lower pressure drop across the trap.

The casing 8 is supported at its lower end by means of circumferentially spaced strut members 16, which may form a tripod-type holder and which are welded, bolted or pinned to the lower end wall of vessel 1. A number of circumferentially spaced wedge-shaped lugs 15 (3 or more) are welded to the lower longitudinal wall of casing 8. Lugs 15 are in vertical alignment with corresponding wedge-shaped sockets formed in the upper ends of struts 16. Casing 8 is installed in vessel 1 simply by lowering it through manway 2 until lugs 15 become firmly seated in struts 16.

The vessel may be readied for service as a reactor, for example, by loading it first with a lowermost layer of ceramic balls 18, which are retained in place by conical screen 19 and which prevent the plugging of the screen by the smaller catalyst particles, then inserting casing 8 in the manner aforesaid, and then filling the vessel with particulated catalyst 17 to a level somewhat below the upper end 9 of casing 8. During the catalyst loading operation, the top of casing 8 may be temporarily closed with a removable cover to prevent catalyst from entering the casing. The top closure member 3 is then bolted into place and the vessel is ready for operation. Vaporous reactants containing foreign particles discharge from downcomer 5 as a downflowing jet which impinges upon grating 11 and is thereby broken up into a plurality of smaller jets clustered around the central region of the grating. The vapor pocket within casing 8 below the grating is under a slightly higher pressure than exists in the remainder of the vessel, with the result that the inflowing vapors must leave the casing, undergoing a sudden and complete reversal of flow direction. A portion of the vapors passes upwardly through the peripheral region of grating 11, thence flows radially outward through the passageway between lower end 7 of downcomer 5 and upper end 9 of casing 8, and finally passes downwardly into annular catalyst bed 17; the remainder of the vapors discharges radially through screen 14 and grating 13 directly into catalyst bed 17. Meanwhile, the foreign solid particles descend by their own inertia to the bottom of casing 8 where they may accumulate as a layer 21 isolated from the catalyst bed 17.

Since casing 8 is most conveniently placed in vessel 1 by lowering it through manway 2, the diameter of the casing is thus limited by the inside diameter of the manway neck. The volume of the casing should be about twice that necessary to store all of the foreign matter which may be expected to accumulate for the duration of the processing period, which in turn is normally fixed by the life of the catalyst or whatever other contact material is employed. Without intending to so limit this invention, it may be stated that, in the specific case of the vapor phase hydrodesulfurization of naphtha in the presence of a cobalt-molybdenum-alumina catalyst, the volume of casing 8 should be equivalent to that corresponding to a bed depth of from three inches to six inches of catalyst bed 17. These considerations usually, but not necessarily, require that the casing be elongated in the vertical direction.

Certain dimensional limitations respecting the size and spacing of downcomer, casing and horizontal grating should be observed if maximum benefit is to be gained from practice of this invention. With reference to FIGURE 1, $D_1$ is the inside diameter of downcomer 5, $D_2$ is the inside diameter of casing 8, and $h$ is the vertical distance between lower end 7 of downcomer 5 and grating 11. In the general case where the downcomer and/or casing have cross-sections other than circular, $D_1$ and $D_2$ would then be interpreted to mean the diameter of circles having respectively equal areas; if the downcomer and/or casing should be tapered, then $D_1$ is to be measured at open end 7 and $D_2$ is to be measured across the upper surface of grating 11. It has already been pointed out that diameter $D_1$ is slightly greater than the diameter of inlet opening 4, e.g., about one line size, and that diameter $D_2$ is greater than $D_1$, usually being limited by the diameter of the upper manway neck of the vessel. If downcomer 5 is positioned too close to upper end 9 of casing 8 or to the grating 11, the pressure drop across the trap will be excessive and the linear gas velocity leaving the trap may be so high as to cause excessive particle entrainment into bed 17. On the other hand, if the casing is spaced too far below the downcomer, too much of the volume of the vessel would be committed to use as an inlet manifold at the expense of catalyst volume, and a portion of the entrained foreign particles may bypass the trap altogether because of inlet jet divergence. It is therefore preferred that divergence angle $\theta$, which is measured between the vertical and a line connecting the interior lower end of the downcomer 5 with the juncture of grating 11 and casing 8, be within the range of about 10° to about 45°, and preferably in the range of 15° to 30°. Since the casing and downcomer are coaxially aligned, it follows that the relationship between $D_1$, $D_2$ and $h$ is given by:

$$D_2 = D_1 + 2h \tan \theta$$

where $\theta$ is not less than 10° nor greater than 45°. Since $D_1$ and $D_2$ are usually independently fixed, this equation determines the permissible limits of the vertical spacing $h$ between downcomer 5 and grating 11. The spacing between lower end 7 of the downcomer and upper end 9 of the casing will be somewhat less than this and should be such as to result in a maximum pressure drop across the trap of not more than about 0.5 p.s.i. at the design throughput.

Various modifications of the specific apparatus illustrated will suggest themselves to those skilled in the contactor art and are accordingly deemed embraced within the scope of the appended claims. For example, casing 8 need not necessarily be of circular cross-section although this is simplest and least costly, but may have a square, rectangular, polygonal or similar noncircular cross-section. In the case of vessels having a removable upper end wall with no manway neck or at least a fairly wide one in comparison with vessel diameter, the downcomer 5 can be eliminated and the casing-grating assembly placed directly beneath the upper feed inlet opening. It is not necessary that casing 8 be supported on vertical struts; alternatively, the casing may be suspended from the downcomer, or from the upper end wall of the vessel, or from top flange 3 by means of suitable bracework, or the casing and downcomer may be integrally fabricated and the complete assembly suspended from the top manway. The strut-mounted embodiment is preferred, however, since the catalyst or whatever other solid contact material may be employed can be most easily loaded into the vessel after the casing is in place and before the top manway is sealed. A further variant is to insert into the lower portion of the casing a removable fine mesh basket or imperforate thin-walled container so that the accumulated fines can be removed from time to time without having to remove the casing itself which in turn would necessitate dumping the catalyst and reloading the vessel. Generally, however, it is inconvenient to take the vessel offstream for this purpose alone and it is therefore preferred that the volume of the casing be sufficient to store all of the fines which may be expected to accumulate during the normal processing period, at the conclusion of which the catalyst is often replaced anyway.

Figure 3:
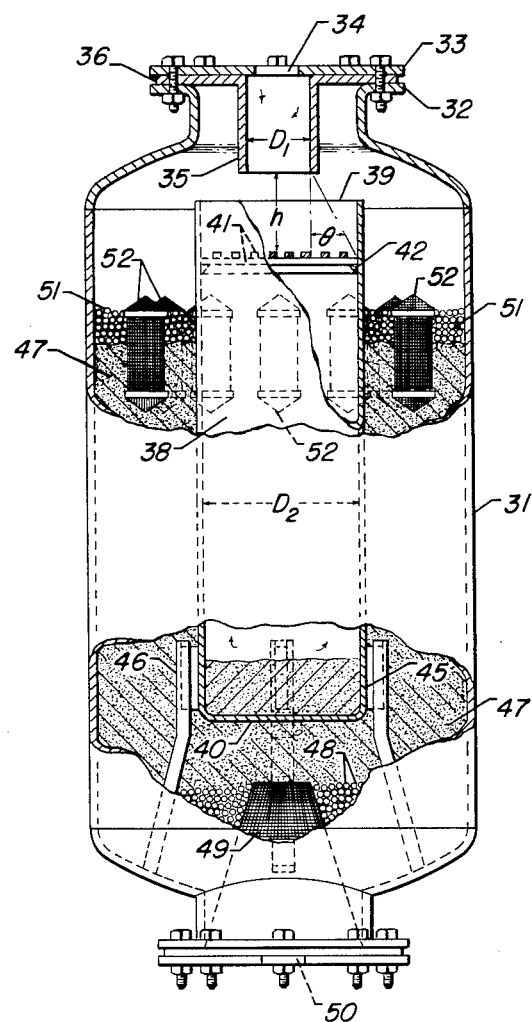
FIGURE 3 is a sectional elevation view of a downflow reactor containing another embodiment of the dirt trap which utilizes a non-vented casing.

FIGURE 3 illustrates a different embodiment of the invention in which the peripheral relief vent means is omitted, the wall of the casing of the trap being imperforate from top to bottom. In FIGURE 3, the pressure vessel or reactor 31 is provided with an upper manway 32 which is normally closed by flange 33 throughbolted thereto. Opening 34 is the upper reactant inlet to the vessel and a similar opening 50 at the bottom of the vessel is the effluent outlet. An axial downcomer 35, having an inside diameter $D_1$ and extending downwardly from inlet 34, is supported in position by a flanged lip portion 36 compressed between manway 32 and flange 33. A cylindrical casing 38, having an inside diameter $D_2$, is axially aligned with and spaced below downcomer 35. The upper end 39 of casing 38 is left open while the lower end thereof is sealed by an imperforate bottom closure member 40. A circular grating member 41 extends horizontally across the upper interior portion of casing 38 and is positioned a short distance below its upper end 39. The grating member 41 may be removably inserted therein and rests upon a support ring 42 attached to the inner surface of casing 38. The openings of the grating may be square, round, oval or slotted and desirably have a minimum inside dimension of from about ½ inch to about 2 inches. The free area of the grating may range from about 15% to about 85%. Casing 38 is supported at its lower end by circumferential strut members 46 which are fixedly attached to the lower end wall of vessel 31. A number of circumferentially spaced wedge-shaped lugs 45 are welded to the lower longitudinal wall of casing 38. Lugs 45 are in vertical alignment with corresponding sockets formed in the upper ends of struts 46 and are seated therein. A lower layer of ceramic balls 48 surrounds a conical discharge screen 49. Above this layer is a bed of catalyst particles 47. An upper layer of ceramic balls 51 is disposed across the top of bed 47. A number of circumferentially spaced wire baskets 52, preferably closed at the top and bottom thereof by screening, are arranged to project slightly above the layer 51 and to extend well into bed 47. These baskets serve to increase the bed entrance surface area and to improve flow distribution through the bed. It will frequently be feasible to eliminate the upper layer of ceramic balls altogether and to rely on the baskets alone for providing uniform flow distribution.

This apparatus functions in the same manner as the embodiment of FIGURE 1. However, the absence of the peripheral vent requires that all of the vapor entering the trap must leave it through grating 41. This results in somewhat higher velocities, increased pressure drop and a potentially somewhat greater amount of fines carryover. Where the proportion of very small foreign particles in the entering reactant stream is low enough, such that there will be no excessive entrainment of fines, the simplified construction of the non-vented trap makes it the more desirable.

The relative size and location of the several elements of the non-vented trap are governed by the same design criteria as in the case of the vented trap. More particularly, the relationship between downcomer diameter, casing diameter and distance $h$ is given by:

$$D_2 = D_1 + 2h \tan \theta$$

where $\theta$ is in the range of about 10° to about 45°.

With both the vented trap and the non-vented trap, but especially in the case of the latter, it is highly desirable that the grating be located a short but substantial distance below the upper open end of the casing rather than precisely at said upper end; preferably the grating member should be installed a distance below said upper end equal to 15–20% of the length of the casing. This assures that the incoming foreign particles which happen to strike the grating will not be deflected into the catalyst bed but will bounce off the wall of the casing and thence drop through the grating to the bottom of the casing. Such depression of the grating also provides a fines disengaging zone for the reverse flowing vapor stream around the periphery of the grating, and brings the zone of pressure differential well down into the casing where it will be of greater benefit.

The term "imperforate," as it is employed in describing the casing wall or lower portion thereof and bottom closure member of both the vented trap and the non-vented trap, means substantially imperforate. That is, it is intended to include not only constructions perfectly free of apertures but also those having a few widely or randomly spaced holes placed there for purposes other than providing fluid distribution and whose aggregate open area is insignificant in comparison with the total surface area of the structural member in question. The number and size of such holes which can be accommodated without negativing the substance of the invention is determinable in any particular case in accordance with sound engineering judgment, consistent with the function of the casing member which is to assure a confined zone of somewhat higher pressure than exists in the contacting chamber proper and to collect the disengaged particle-form foreign matter. In general, the aggregate open area of such widely or randomly spaced holes is considered insignificant where it does not exceed about 0.2% of the total surface area of the structural member in question. For example, the casing wall could have 3 or 4 small holes punched or drilled therethrough to furnish engaging means for a crane lifting hook or wire rope, and still be deemed imperforate for the purpose of this invention. On the other hand, the term "imperforate" excludes appreciable areas of screening, grating, patterns of holes or perforations and the like whose primary object is to afford a relatively unrestricted fluid flow path through the casing wall.

The instant invention can be utilized to advantage in any fixed bed downflow contactor employed in the types of processes earlier enumerated. It is most suitable for a vessel having single phase, all vapor flow through it because liquid phase would enter and flood the trap, soon rendering it inoperable. However, the present dirt trap may be used, for instance, in a contacting chamber having two phase flow therethrough where liquid and gas enter the chamber separately and the gas is directed into the trap whereas the liquid is peripherally distributed to the annular zone around the trap. This invention may also be used in the same manner for a contacting chamber wherein liquid and gas are separately charged but under processing conditions such that a single phase vapor is formed by mixing of the liquid and gas within the contacting chamber.

This invention substantially alleviates the currently experienced problem of excessive pressure drop due to partial plugging of the contactant bed in downflow contactors. Whereas in the absence of this invention, process units employing downflow reactors often must be shut down prematurely for this reason alone, the present invention permits a greatly extended length of run, a consideration which is particularly important where one or more process units supply the feed stock or receive the product or are otherwise so closely integrated with the unit which is susceptible to high pressure drop that they all must be shut down together.

I claim as my invention:

1. In a contacting chamber having a fluid inlet in the top thereof, a dirt trap therefor which comprises a vertical casing having an open upper end spaced below and axially aligned with said fluid inlet, an imperforate closure member across the lower portion of said casing, a grating means extending across the upper portion of the casing, and peripheral relief vent means comprising a plurality of peripherally spaced perforations in said casing arranged in a narrow band immediately below said grating, the remaining portion of said casing below said relief vent being imperforate.

2. The apparatus of claim 1 further characterized in that said casing is of greater diameter than said fluid inlet.

3. The apparatus of claim 1 further characterized in that said perforations are both vertically and peripherally spaced.

4. In a contacting chamber having a fluid inlet in the top thereof, a dirt trap therefor comprising an axial cylindrical downcomer depending from said inlet and being of greater diameter than the inlet, a vertically elongated cylindrical casing having an open upper end spaced below and axially aligned with said downcomer, said casing being of greater diameter than the downcomer, an imperforate bottom closure member across the lower end of said casing, a circular grating extending horizontally across the upper interior portion of the casing, and a peripheral relief vent means comprising a plurality of peripherally spaced perforations in said casing arranged in a narrow band immediately below said grating, the remaining lower portion of said casing being imperforate and fluid tight.

5. The apparatus of claim 4 further characterized in that the inside diameter of said casing exceeds the inside diameter of said downcomer by the factor $2h(\tan \theta)$ where $h$ is the vertical distance between the lower end of said downcomer and the grating, and angle $\theta$ is not less than 10° nor greater than 45°.

6. The apparatus of claim 4 further characterized in that said casing is supported by circumferentially spaced strut members extending upwardly from the lower end of said contacting chamber.

7. In a contacting chamber having a fluid inlet in the top thereof, a dirt trap therefor comprising a vertical imperforate-walled casing having an open upper end spaced below and axially aligned with said fluid inlet, an imperforate closure member across the lower portion of said casing, and a grating means extending completely across the upper portion of the casing below said upper end.

8. In a fixed bed catalytic reactor having a reactant inlet in the top thereof, a dirt trap therefor comprising an axial cylindrical downcomer depending from said inlet, a vertically elongated cylindrical imperforate-walled casing having an open upper end spaced below and axially aligned with said downcomer, said casing being of greater diameter than the downcomer, an imperforate bottom closure member across the lower end of said casing, and a grating means extending horizontally and completely across the upper interior portion of the casing below said upper end.

9. The apparatus of claim 8 further characterized in that the inside diameter of said casing exceeds the inside diameter of said downcomer by the factor $2h(\tan \theta)$ where $h$ is the vertical distance between the lower end of said downcomer and the grating, and angle $\theta$ is not less than 10° nor greater than 45°.

10. The apparatus of claim 8 further characterized in that said casing is supported by means of circumferentially spaced strut members extending upwardly from the lower end of said reactor.

11. In a fixed bed catalytic reactor having a reactant inlet in the top thereof, a dirt trap therefor comprising an axially positioned cylindrical downcomer depending from said inlet, a vertically elongated cylindrical imperforate-walled casing having an open upper end spaced below and axially aligned with said downcomer, said casing having an inside diameter exceeding the inside diameter of the downcomer by the factor $2h(\tan \theta)$ where $h$ is the vertical distance between the lower end of said downcomer and the grating, and angle theta is not less than 10° nor greater than 45°, an imperforate bottom closure member across the lower end of said casing, a circular grating means extending horizontally completely across the upper interior portion of the casing below said upper end, and circumferentially spaced strut members extending upwardly from the lower end of said reactor to support the casing.

References Cited by the Examiner
UNITED STATES PATENTS

| | | | |
|---|---|---|---|
| 1,065,542 | 6/1913 | Main | 210—519 |
| 1,579,205 | 4/1926 | Blakesley et al. | 210—308 |
| 2,156,329 | 5/1939 | Beck | 210—306 |
| 2,168,472 | 8/1939 | Cloud | 55—319 |
| 3,006,740 | 10/1961 | Maggio | 208—146 |
| 3,100,141 | 8/1963 | Donovan | 210—152 |

FOREIGN PATENTS 11,842     1903    Great Britain.

REUBEN FRIEDMAN, *Primary Examiner.*